United States Patent

[11] 3,566,761

| [72] | Inventor | Domenico Domenighetti<br>Via Nosetto 6, 6500 Bellinzona,<br>Switzerland |
|---|---|---|
| [21] | Appl. No. | 796,822 |
| [22] | Filed | Feb. 5, 1969 |
| [45] | Patented | Mar. 2, 1971 |
| [32] | Priority | Feb. 7, 1968 |
| [33] | | Switzerland |
| [31] | | 1992/68 |

[54] GROUND-TAMPING MACHINE MADE OF A TOWING UNIT MOUNTED ON RUBBER WHEELS AND OF A TOWED TAMPING UNIT
4 Claims, 4 Drawing Figs.

[52] U.S. Cl. .................................................. 94/50, 280/444
[51] Int. Cl. .................................................. E01c 19/24
[50] Field of Search .................................................. 94/50, 50 (P), 50 (P & R); 280/426, 442, 444

[56] References Cited
UNITED STATES PATENTS

| 2,270,390 | 1/1942 | Summers | 94/50 |
| 2,987,975 | 6/1961 | Seaman | 94/50 |
| 3,060,818 | 10/1962 | Roberts | 94/50 |
| 3,108,520 | 10/1963 | Garis | 94/50 |
| 3,229,602 | 1/1966 | Vivier | 94/50 |
| 3,249,027 | 5/1966 | Peterson | 94/50 |
| 3,291,014 | 12/1966 | Paramythioti | 94/50 |
| 3,316,822 | 5/1967 | Seaman | 94/50 |

*Primary Examiner*—Nile C. Byers, Jr.
*Attorney*—Young & Thompson

ABSTRACT: A ground-tamping machine comprises a tractor unit and a trailer unit. The tractor unit is mounted on at least three rubber-tired wheels that are axially aligned and supported singly or in pairs on arms that are maintained at an adjustable angle by fluid motors. A fluid motor interconnects the tractor and trailer for relative horizontal swinging movement. The trailer comprises a vibratory drum which may be plain cylindrical or a sheep's-foot roller.

Patented March 2, 1971

3,566,761

INVENTOR
DOMENICO DOMENIGHETTI

BY Young + Thompson

ATTORNEYS

GROUND-TAMPING MACHINE MADE OF A TOWING UNIT MOUNTED ON RUBBER WHEELS AND OF A TOWED TAMPING UNIT

The present invention relates to a tamping machine, in particular for tamping earth, made of two coupled but separable units: a towing unit mounted on rubber wheels and a towed tamping unit, the characteristics of which may vary according to the type of work to be performed.

The separability of the tamping machine of the invention into two units has a first object of permitting to couple to a single tractor different types of tamping units e.g. tamping, units with rubber wheel means, with cylinders or with sheeps-foot rollers or the like, each of said tamping units having a particular application.

A further object of the invention is to permit the use, as a towed unit, of a vibrating tamping roller, the deep tamping action of which augments the surface tamping action which is characteristic of the static rubber rollers such as the tractor unit of the present invention.

The coupling of a tractor unit, having a plurality of rubber wheels, to a vibrating roller may provide for a very thorough tamping action extending from the ground surface down to great depths. It results that this combined machine has a much broader range of application and the possibility of being utilized on many different types of ground.

In particular the tractor unit is supported on the ground by at lest three parallel wheels which may be coaxial and thus simultaneously made to oscillate by the action of at least a pair of linked arms pivoted, at one side, to the tractor frame and, at the opposite side, to the shaft common to all the wheels as well as resiliently suspended by means of at least a pair of pneumatic or hydraulic cylinders. Furthermore said wheels may be independent from each other as far as their oscillation as well as their suspension is concerned.

In this case each wheel will be supported by at least a linked arm with its own pneumatic or hydraulic suspension as well as its own transmission means for the movement generated by a common drive shaft. The towed tamping unit is connected to the tractor by an articulated joint with adjustment of the angulation effected by means of a hydraulic piston operated from the driver's seat.

To make the invention better understood two embodiments of the same will be described in more detail hereinafter, by way of example only, and referring to the accompanying drawing in which.

Figure 1:
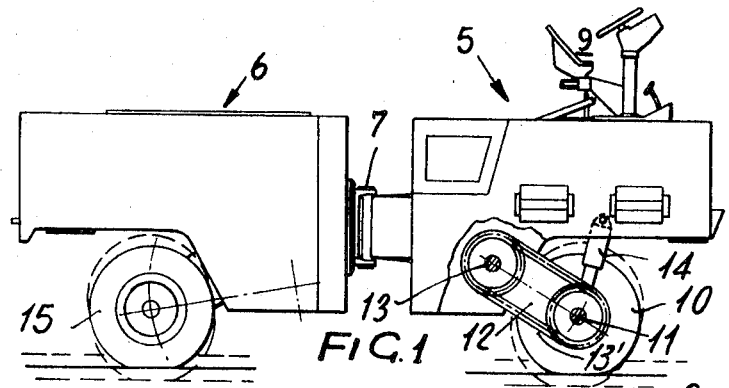
FIG. 1 is a side view of a tamping machine comprised by a tractor unit connected by an articulated joint to a tamping unit.
Figure 2:
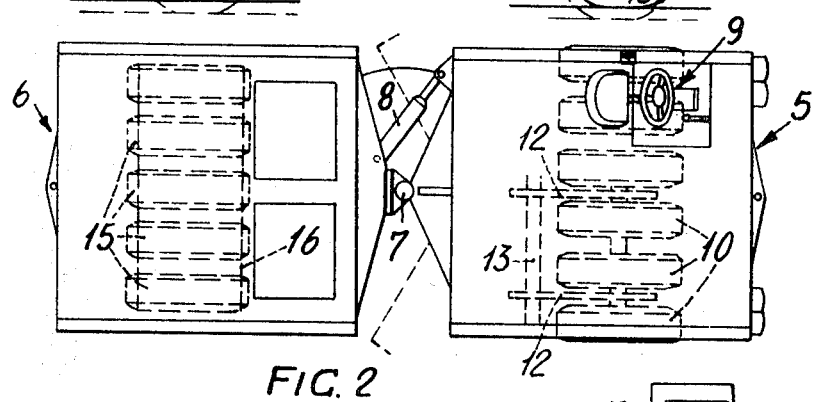
FIG. 2 is a plan view of the machine illustrated in FIG. 1.

From the drawing and in particular from FIGS. 1 and 2 it may be clearly seen that the tamping machine of the invention is made up of a tractor 5 and a tamping unit 6 coupled and connected together by the pin 7 and the pneumatic or hydraulic piston-cylinder unit 8 operated from the driver's seat 9. The tractor unit 6 moves forward on the wheels 10 which may be three or more (six wheels are shown by way of example in the drawing) in consideration of the fact that the machine is to move on uneven, upset ground and must be able to tow or drag the tamping unit 6 following behind.

The set of wheels 10 will be preferably parallel, equidistant and coaxial to each other and are driven by the chain 13'. The shaft 11, having said wheels mounted thereon, is supported by at least two arms 12 linked, at one end, to the frame and preferably to the drive shaft 13 and, at the opposite end, to the shaft 11 common to all the wheels. An elastic suspension is provided between the tractor frame and said linked arms 12 and consists of at least a pair of pneumatic or hydraulic cylinder-piston units 14.

The wheels 10 may be independent from each other: in their oscillation with respect to the shaft 13, which they will be connected to, each by at least an arm 12; in their elastic suspension provided by cylinders 14, one for each arm; as well as in their movement, each wheel being driven by its own chain 13'. According to a modified and preferred arrangement said wheels may be combined to form independent pairs, each pair being supported by an intermediate arm as illustrated in FIG. 2.

The plurality of wheels 10 of the tractor unit provide for a pretamping of the ground thereby smoothing the way to the successive operation of the following tamping unit 6 which may be provided with a plurality of rubber wheels 15 similar to but offset with respect to those of the tractor. Alternatively, said tamping unit may be provided with a conventional roller 16, according to the requirements of its particular application, or with a sheeps-foot roller. It should be understood that these different towed tamping units will preferably be of the vibrating type.

Figure 3:
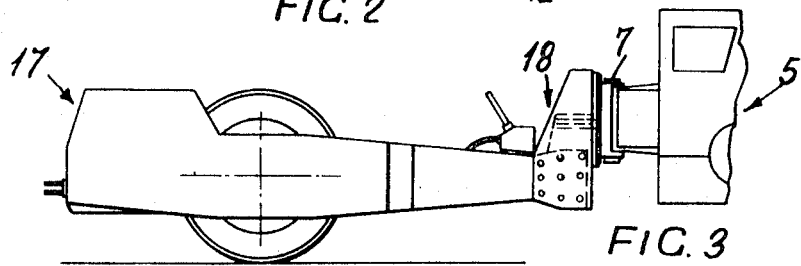
FIG. 3 is a side view of the combination of a tractor with a vibrating roller of conventional type.
Figure 4:
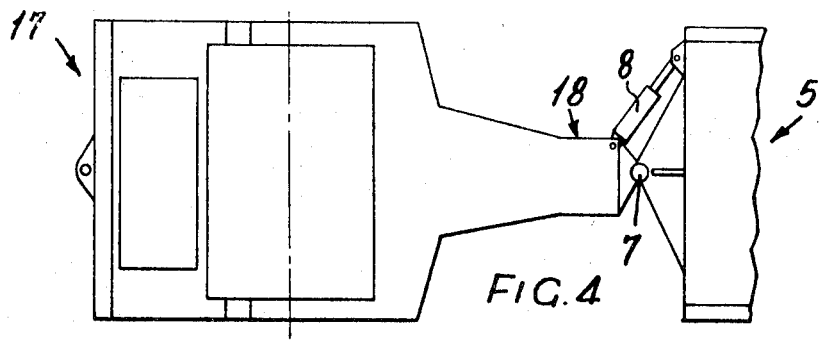
FIG. 4 is a plan view corresponding to FIG. 3.

In FIGS. 3 and 4 the vibrating roller 17 towed by the tractor 5 is provided with an adjusting device 18 for the connection with the pin 7 and for the fastening of the rear end of the direction cylinder 8.

I claim:

1. A ground-tamping machine comprising a tractor unit and a towed earth-compacting unit, an articulated joint by which the two said units are interconnected to each other for relative horizontal swinging movement, a fluid motor for swinging said units horizontally relative to each other, at least three rubber-tired wheels on which said tractor unit is supported, vertically swinging arms by which said wheels are connected to the tractor unit, and a plurality of fluid motors by which said arms are selectively vertically adjustable to distribute the weight of the tractor unit on the ground, said towed earth-compacting unit comprising a vibrating drum.

2. A machine as claimed in claim 1, said drum comprising a sheep's-foot roller.

3. A machine as claimed in claim 1, said drum being a cylindrical roller whose cylindrical surface rolls on the ground.

4. A machine as claimed in claim 1, the axes of vertical swinging movement of said arms being coaxial.